United States Patent [19]

Christian

[11] Patent Number: 4,688,691
[45] Date of Patent: Aug. 25, 1987

[54] PROCESS FOR ATTACHING CLAD COMPONENTS AND PRESSURE VESSEL FORMED THEREBY

[75] Inventor: Ralph R. Christian, St. Louis County, Mo.

[73] Assignee: Nooter Corporation, St. Louis, Mo.

[21] Appl. No.: 821,477

[22] Filed: Jan. 22, 1986

[51] Int. Cl.$^4$ ............................................. B65D 25/14
[52] U.S. Cl. ........................................ 220/3; 228/175; 228/184; 228/225; 220/453; 220/80
[58] Field of Search ................. 220/DIG. 29, 80, 453, 220/466, 3; 228/170, 175, 165, 225, 184

[56] References Cited

U.S. PATENT DOCUMENTS

| | | | |
|---|---|---|---|
| 2,073,684 | 3/1937 | Coakley | 228/175 X |
| 2,177,868 | 10/1939 | Chapman | 228/165 |
| 3,365,786 | 1/1968 | Takemura et al. | 228/184 X |
| 3,443,306 | 5/1969 | Meyer | 228/165 |
| 3,596,793 | 8/1971 | Kocher et al. | 220/80 |
| 3,733,686 | 5/1973 | Maucher | 228/175 X |
| 4,073,427 | 2/1978 | Keifert | 228/165 |
| 4,272,005 | 6/1981 | Jackson et al. | 228/175 X |

Primary Examiner—Kenneth J. Ramsey
Attorney, Agent, or Firm—Gravely, Lieder & Woodruff

[57] ABSTRACT

Segments of a clad pressure vessel are welded together along seams at which the cladding is removed to expose a steel backing, so that initially a groove opens out of the cladding toward the interior of the vessel at each seam. Batten strips cover the grooves, and each of those strips has a depressed center portion which fits into the groove for that strip to center the strip along its groove. The batten strip also has flanges which extend outwardly from the depressed portion to overlie the cladding, to which they are welded along their edges. Cover plates are welded over the ends of batten strips. Thus, the cladding, the batten strips and the cover plates totally isolate the steel backing of the pressure vessel from the interior of the vessel, so that the contents of the vessel will not corrode the backing.

19 Claims, 12 Drawing Figures

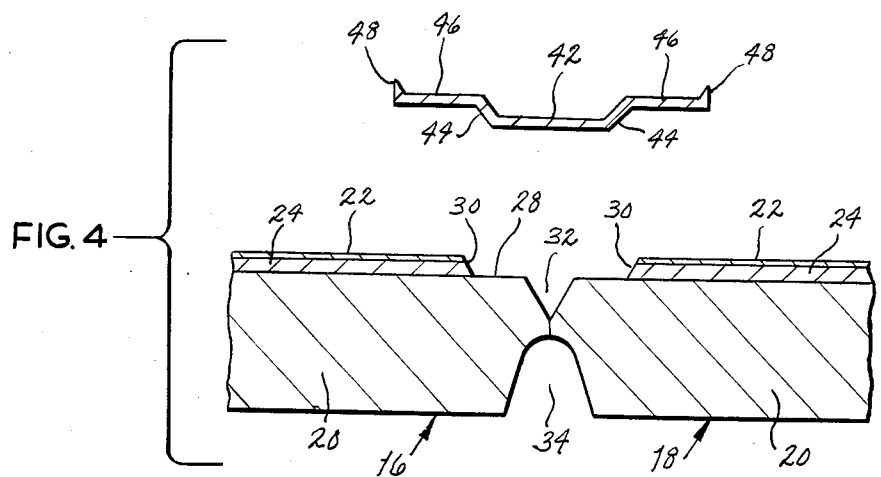
FIG. 4
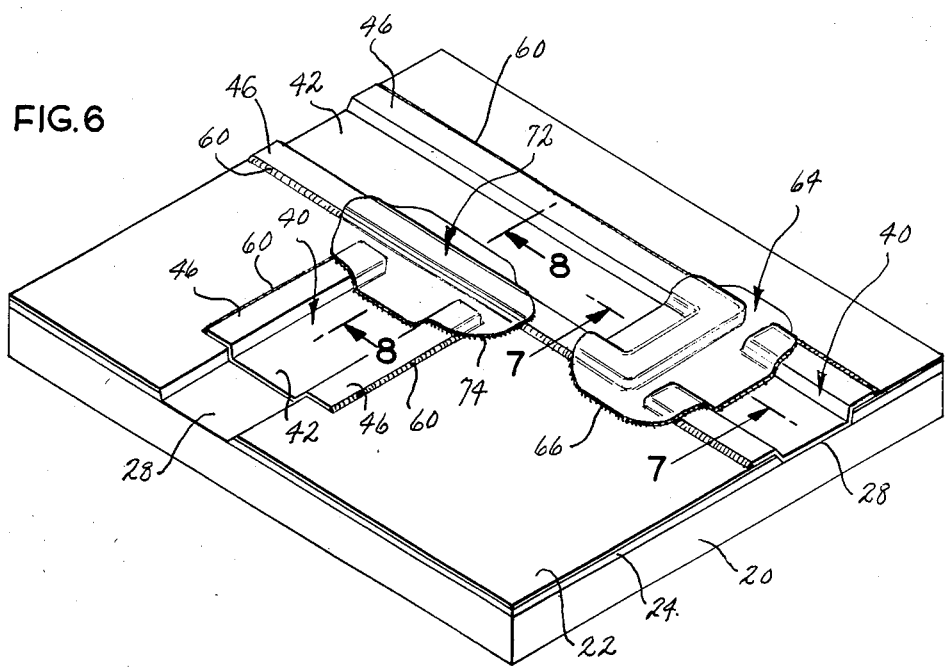
FIG. 6
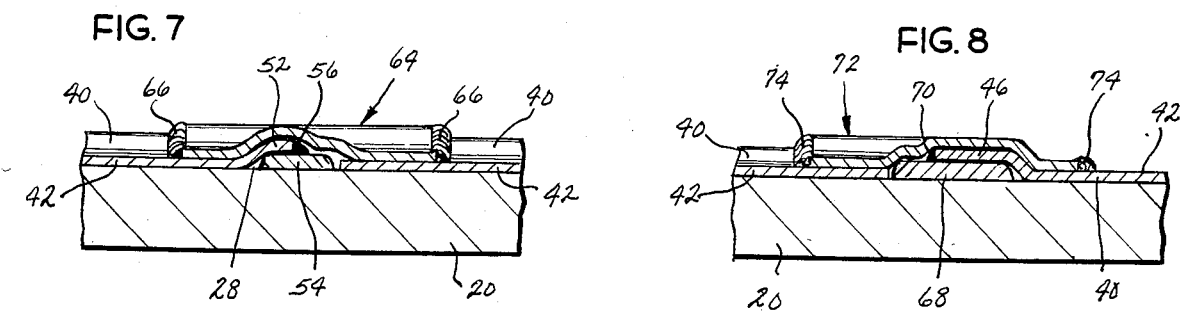
FIG. 7
FIG. 8

PROCESS FOR ATTACHING CLAD COMPONENTS AND PRESSURE VESSEL FORMED THEREBY

BACKGROUND OF THE INVENTION

This invention relates to a process for joining clad metal components together by welding and to a fabricated clad structure formed thereby.

Among the characteristics of steel which contribute to its widespread use in pressure vessels are its strength and availability at reasonable cost, but steel is attacked by many chemicals and cannot be exposed to such chemicals, particularly at elevated temperatures and pressures. To offset this problem, it has been common practice to clad steel with less reactive, yet more expensive, refractory metals, such as tantalum, zirconium and titanium and their alloys. This, however, presents a whole new set of problems.

Some of the so-called refractory metals which are currently used as cladding for steel plate possess relatively high melting temperatures—indeed considerably higher than that of steel—so that a weld made along the cladding will melt the steel beneath the cladding even though the weld does not fully penetrate the cladding. When the steel again solidifies its physical characteristics are changed, and the result is a region of weakness in the steel backing. This problem has been overcome by interposing a layer of copper between the refractory metal cladding and the steel backing. The copper acts as a heat sink, and although it melts when the refractory metal is welded, it distributes the heat over a widespread area, and this prevents the underlying steel from melting.

The typical pressure vessel possesses a generally cylindrical configuration, and often has hemispherical heads. As such, it is fabricated from various components and segments which are welded together. For example, the hemispherical heads each constitute separate components as does the cylindrical side wall which is interposed between them. Often the heads and the side wall are themselves fabricated from a multitude of segments. These components and segments must be welded together in a manner which presents a totally inert surface toward the interior of the vessel.

U.S. Pat. No. 3,443,306 of J. Meyer entitled Method of Joining Clad Material discloses one procedure for welding together clad steel components when the cladding is tantalum which is separated from the steel backing by a copper intermediate layer. More specifically, the tantalum cladding and copper intermediate layer are stripped away from the steel backing at each edge where the joint is to be formed (FIG. 1), and when the two components are brought together, this creates a groove in the otherwise continuous layer of cladding. The groove exposes the steel backing for each component in the region of the joint, and here the two components are welded together along a butt weld in the steel. Next a filler strip of copper is inserted into the groove and either tack welded or continuously welded in place, and then a flat batten strip, which is formed from the same metal as the cladding is placed over the copper filler strip. The width of the batten strip exceeds the width of the groove so that the edges of the batten strip overlie the cladding on the two components, and along these edges the batten strips are welded to the cladding. Again care must be exercised to prevent the weld from fully penetrating the cladding, for any total penetration will draw molten copper into the weld and render it brittle.

While the foregoing procedure seems relatively simple, it is not. First, the batten strip is difficult to center over the groove and filler strip because it completely obscures the groove. Should it not be centered, the prospects of melting the filler strip or the weld metal which secures it are increased, and of course whenever such a melt occurs, copper or some other foreign metal is drawn into the tantalum weld to weaken it. Secondly, it is common practice to tack weld the batten strip in place before the full welds are made along its edges, but the batten strip, being straight in cross section, has a tendency to distort when tack welded. Finally, the copper filler strip and the welds which are used to secure it represent additional material which increases the cost of the whole procedure.

SUMMARY OF THE INVENTION

One of the principal objects of the present invention is to provide a process for welding together steel or other metal components which are clad with a corrosion resistant metal, with the cladding being removed in the region of the weld, yet with that region being protected by a somewhat channel-shaped batten strip that fits into the space where the removed cladding once existed. Another object is to provide a process of the type stated in which the depressed portion of the batten strip fits into the groove formed by the removal of cladding at the joint, and thereby centers the batten strip over the weld joint. A further object is to provide a process of the type stated which requires no filler strip for the groove. An additional object is to provide a process of the type stated which is suitable for likewise protecting the underlying backing at the intersection of circumferential and longitudinal weld joints in the pressure vessel. Still another object is to provide a pressure vessel constructed in accordance with the process. These and other objects and advantages will become apparent hereinafter.

DESCRIPTION OF THE DRAWINGS

In the accompanying drawings which form part of the specification and wherein like numerals and letters refer to like parts wherever they occur

FIG. 4 is an exploded sectional view showing the pressure vessel segments prior to being welded and further showing the batten strips detached from the pressure vessel segments;

FIG. 6 is a perspective view in section showing cover plates welded over the ends of the batten strips as well as over a T-shaped intersection between batten strips;

FIG. 7 is a sectional view taken along line 7—7 of FIG. 6 and showing a filler strip at the end of a batten strip;

FIG. 8 is a sectional view taken along line 8—8 of FIG. 6 and showing another filler strip at a T-shaped intersection of batten strips;

DETAILED DESCRIPTION

Figure 2:
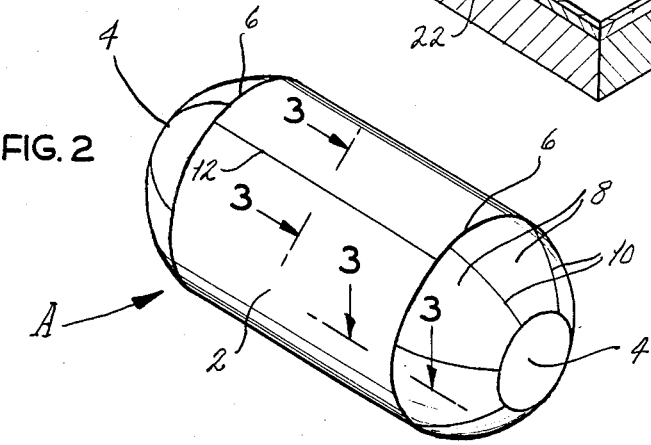
FIG. 2 is a perspective view showing a pressure vessel provided with welded seams along which improved batten strips of the present invention are utilized.

Referring now to the drawings, a pressure vessel A (FIG. 2) possesses a cylindrical center portion 2 and hemispherical heads 4 which are joined to the cylindrical portion 2 at circumferential seams 6. Each head 4 may be composed of segments 8 which are joined edge-to-edge at arcuate seams 10. Moreover, the center portion 2 may be formed from a flat plate rolled into a cylindrical configuration, and if so, it will possess at least one longitudinal seam 12. The arcuate seams 10 for the head 4 and the longitudinal seam 12 for the center portion 2 intersect the circumferential seams 6 along which the heads 4 are attached to the center portion 2. Actually, the seams 6, 10 and 12 are not highly visible, but represent weld joints produced in accordance with the present invention.

At each seam 6, 10 and 12 two metal segments 16 and 18 (FIG. 3) are joined together to produce a continuous structure, that is a continuous pressure vessel wall. Each pressure vessel segment 16 and 18 includes a steel backing 20, which may be a single steel plate or multiple plies of steel plate having a thickness adequate to withstand the pressure within the vessel A. The particular steel of the backing 20 is not too important as long as it is thick enough to withstand the pressure, and among suitable steels are carbon steel, stainless steel, high alloy steel and chrome-molybdeum steel. Each segment 16 and 18 also includes a cladding 22 which is formed from a corrosion resistant metal, such as tantalum, and is presented inwardly toward the interior of the vessel A. Where the melting temperature of the cladding 22 is considerably higher than the melting temperature of the steel backing 20, a protective layer 24 is interposed between the backing 20 and the cladding 22, and this layer should be a metal that has a high specific heat and is capable of being metallurgically bonded to both the backing 20 and the cladding 22. Where the backing 20 is steel and the cladding 22 is tantalum, copper is suitable for the protective layer 24. Thus, the protective layer 24 is metallurgically bonded to the steel at one of its faces and to the cladding 22 at the other of its faces. As a consequence, the cladding 22 is presented toward the interior of the vessel A, and indeed forms the surface against which the contents of the vessel A come. The backing 20, on the other hand, is presented outwardly and is exposed at the exterior of the vessel A.

At any seam 6, 10 or 12 the two pressure vessel segments 16 and 18 along that seam are joined edge-to-edge, but only after a succession of process steps required to complete the seam 6, 10 or 12. Those process steps are described with reference to a vessel A containing in its segments 16 and 18, a steel backing 20, a tantalum cladding 22 and a copper protective layer 24, since tantalum is an important cladding material. It should be recognized, however, that the process leads itself to claddings 22 and protective layers 24 formed from other materials, and also to claddings 22 bonded directly to backings 20.

At the very outset, the tantalum cladding 22 and the copper protective layer 24 are stripped away from the steel backing 20 along the edges of each segment 16 and 18, and this may be effected in a milling machine or with a shaper or an edge planer, but irrespective of how it is achieved, enough metal must be removed to expose the backing along the slight kerfs in the segments 16 or 18 (FIG. 4). Thus, when the two segments 16 and 18 are brought together edge-to-edge, a groove 28 opens out of them. The kerfs should be flat or more accurately should have their bases along the former copper-steel interface. They should also have their sides beveled at about 60° to the flat base. Thus, the groove 28 has beveled side walls or edges 30. Also the backing 20 for each segment 16 and 18 along its edges is provided with a relatively shallow beveled cut at the machined kerf and a much deeper beveled cut on its opposite face, so that when two segments 16 and 18 are together, edge-to-edge, the shallow beveled cuts form a relatively shallow groove 32 of V-shaped configuration, while the deeper bevels formed a much deeper groove 34 of U-shaped configuration. The shallow groove 32 opens through the groove 32 in the cladding 22 toward the interior of the vessel A, while the other groove 34 opens out of the exterior face of the vessel A.

After the bevels for the grooves 28, 32 and 34 are formed, the two segments 16 and 18 are brought together edge-to-edge, that is with their back faces and machined faces flush (FIG. 4), and they are held in that position by suitable jigs. Then they are joined together along a weld 36 (FIG. 3) made in several passes through the two grooves 32 and 34. Thereupon, the portion of the weld 36 that occupies the former shallow groove 32 is ground flush with the base of the groove 28 in the cladding 22. The other exposed surface of the weld 36 may likewise be ground flush with the exterior surface of the backing 20, although this is not necessary.

Figure 3:
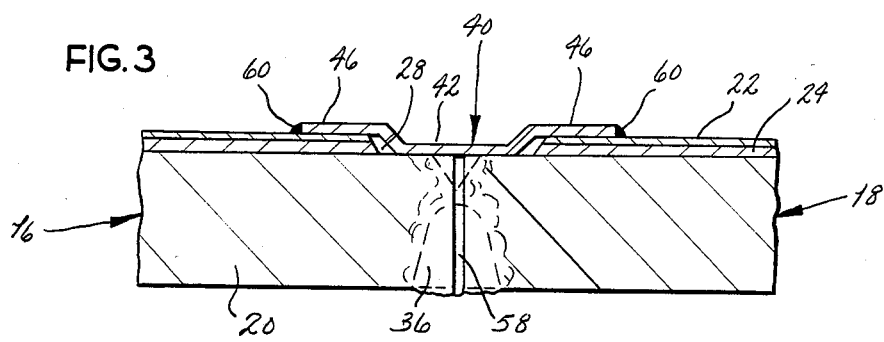
FIG. 3 is a sectional view of the pressure vessel taken along line 3—3 of FIG. 2 and showing a depressed batten strip forming part of the present invention.

Once the two segments 16 and 18 are attached along the weld 36, a batten strip 40 (FIGS. 3–5) is placed in the groove 28 and over the adjacent regions of the cladding 22 on each side of the groove 28. In cross-section the batten strip 40 possesses a channel-shaped configuration (FIG. 4), it having a depressed center portion 42 bounded by oblique walls 44 which lead out to elevated side portions or flanges 46. The spacing between the oblique walls is somewhat less than the spacing between the beveled edges 30 of the groove 28, so that the center portion 42 fits into the groove 28. Moreover, the offset between the flanges 46 and the center portion 42 equals the combined thickness of the cladding 22 and the protective layer 24, so that when the center portion 42 rests against the base of the groove 28, the flanges 46 lie against the cladding 22 (FIG. 3). Each flange 46 is wide enough to extend about ½ inch beyond that edge of the groove 28 at which it is located. Along their outside edges, the flanges 46 are turned upwardly in the form of lips 48 (FIG. 4) which supply weld metal for thereafter joining the batten strip 40 to the cladding 22.

The batten strip 40 is centered with respect to the groove 28 over which it lies by its depressed center portion 42 which projects into the groove 28 (FIG. 3). Indeed, the strip 40 is held temporarily in the groove by tack welding along the flanges 46 at intervals of from one to two inches, with a shield of inert gas being used for such tack welding. Then the edges of the flanges 46 are sealed temporarily to the cladding 22 by strips 50 of adhesive-backed tape (FIG. 5) which extend along the side of the batten strip 40, adhering to the exposed surfaces of its flanges 46 as well as to the adjacent exposed surfaces of the cladding 22. The strips 50 of tape serve to isolate the groove 28 from the surrounding atmosphere.

Irrespective of whether the batten strip 40 occupies the groove 28 along one of the circumferential seams 6, or along one of the arcuate seams 10, or along the longitudinal seam 12, it will have two ends. In the case of the circumferential seam 6, these ends are next to each other, whereas in the case of the arcuate and longitudinal seams they are remote. At one of its ends, the depressed center portion 42 of the batten strip 40 merges into a raised cross portion 52 (FIG. 7) which extends outwardly to the elevation of flanges 46. Moreover, the portion of the groove 28 which underlies the cross portion 52 is occupied by a filler metal, preferably in the form of a weld metal pad 54 which is welded with a metal that is compatible with the steel backing 20, the tantalum cladding 22 and strip 40, and the copper intermediate layer 24 in the sense that all three can be welded together—at least temporarily. In this regard, the weld pad 54 is welded to the backing 20, and is joined to the raised cross portion 52 at the end of the strip 40 along another weld 56 which extends into a small region of the cladding 22 at each end of the weld pad 54, although it does terminate short of the raised lips 48 along the sides of strip 40. The weld 56, like the strips 50 of tape, serves to isolate the groove 28 from the surrounding atmosphere.

Indeed, the weld 56 together with the weld pad 54 constitute a dam at the end of the batten strip 40 for preventing an inert gas from escaping from the groove 28 at that end of the strip 40. In this regard, the welding of tantalum must take place in a nonoxidizing atmosphere, and to achieve this end the batten strip 40 is bathed in an inert gas on both its inside and outside faces. As to the former, the inert gas is introduced into the groove 28 through a hole 58 (FIGS. 3 & 5) which is drilled through the weld 36 that joins the backings 20 of the two segments 16 and 18. The hole 58 opens into the groove 28 in the region of the raised cross portion 52 on the batten strip 40, and, by reason of the weld pad 54 and weld 56, the gas can flow in only one direction, that is away from the weld 56. Moreover, very little gas escapes beneath the flanges 46, because the strips 50 of tape form a seal along those flanges. Thus, the inert gas floods the groove 28, or more accurately, the region beneath the batten strip 40, and flows the full length of the groove 28, it being discharged from the opposite end of the groove 28.

Figure 1:
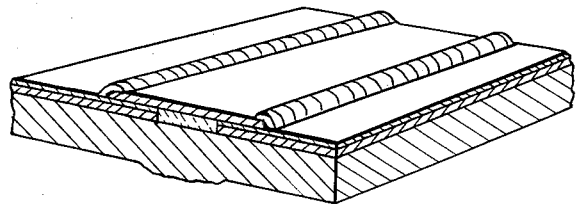
FIG. 1 is a perspective view showing a section of a pressure vessel where two segments are joined together at a weld coupled with a flat batten strip that is welded to the lining of the pressure vessel.
Figure 5:
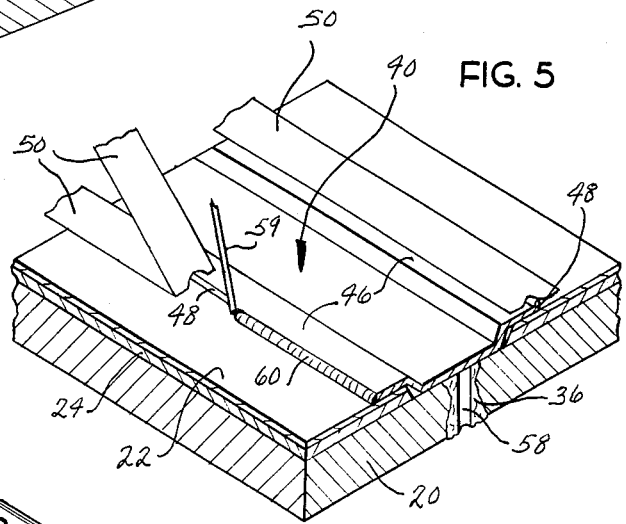
FIG. 5 is a perspective view in section showing the batten strip being welded to the cladding.

At this juncture, the batten strip 40 is in condition to be welded to the cladding 22. This is achieved by peeling back the strip of tape 50 along one of the flanges 46 a short distance, starting at the cross weld 56 and flooding the region formerly overlain by the strip 50 of tape with an inert gas. An arc is struck between an electrode 59 (FIG. 5), on one hand, and the edge of the flange 46 and the adjacent portion of the cladding 22 on the other, and this weld melts the upwardly turned lip 48 on the flange 46 and the underlying cladding 22, causing the former to transform into a convex weld bead 60, that is, a convex fillet weld (FIGS. 3 & 5). The bead 60 penetrates the edge of the flange 46 and indeed obliterates the lip 48, and further penetrates the surface of the cladding 22, but does not go fully through the cladding 22 and is therefore not contaminated by the underlying copper of the protective layer 24. And while the protective layer 24 may become molten, it dissipates the heat widely and indeed sufficiently to enable the portion of the steel backing 20 that is behind the weld bead 60 to remain solidified throughout the welding process.

The arc is advanced along the one edge of the flange 46 until it reaches the opposite end of the batten strip 40, at which time it is terminated, and while it is advanced, the strip 50 of tape is peeled back immediately ahead of it (FIG. 5). Then the electrode 59 is repositioned along the lip 48 of the other flange 48, again at the cross weld 56, and another weld bead 60 is produced along that flange in the same manner. During the welding along both flanges 46, the inside and outside surfaces of the flanges 46 are constantly bathed in inert gas to exclude oxygen from the molten tantalum of the weld bead 60. The inert gas for protecting the inside surfaces of the flanges derives from the supply that is introduced through the hole 58 in the weld 36. This gas must be maintained at relatively low pressure in the groove 28 to prevent blow outs from developing along the weld beads 60. Some inert gas escapes in the region immediately ahead of the advancing welding arc, for it is in this region that the strip of tape 50 is peeled back.

After the two weld beads 60 are completed, the ends of the batten strip 40 are covered with end caps 64 (FIG. 6) which overlap the cladding 22 and are welded around their perimeters to the cladding 22 and to the batten strips 40, all along peripheral weld beads 66. Like the beads 60, the beads 66 do not fully penetrate the cladding 20, nor do they fully penetrate the thicker batten strip 40. The end caps 64 are peened down against the batten strips 40 or otherwise shaped to conform to the contour of those strips, and as such they contain undulations and compound curvatures to accommodate the oblique walls 44 of the depressed portion 42 and the raised flanges 46 of the batten strips 40, as well as the weld beads 60 along the sides of the batten strips 40. When the two ends of the batten strip 40 are adjacent to each other, as in the case of the batten strip 40 for the circumferential seam 6, a single end cap 64 may be used to cover both ends of the batten strip 40. In any event, the end cap 64 constitutes a closure that blocks that end of the strip 40 at which it is located and cooperates with the weld bead 66 along its periphery to isolate the groove 28 from the region to which the cladding 22 is exposed.

Where two seams intersect at a T-shaped intersection, such as at the intersection of the circumferential seam 6, on one hand, and an arcuate or longitudinal seams 10 or 12 on the other, the grooves 28 for those seams likewise intersect at T-shaped intersections (FIG. 6). At each such intersection the weld bead 60 along that flange 46 which passes over the intersecting groove 28 is interrupted at the groove 28. Here a weld pad 68 (FIG. 8) is welded across the groove 28, that is across the groove 28 that terminates at the intersection and is welded to the backing 20 along its sides, all such that the weld pad 68 will underlie one of the flanges 46 for the batten strip 40 that lies in the groove 28 which extends through the intersection. At the intersection, this batten strip 40 is at its flange 46 welded to the underlying weld pad 68 with a weld metal that is compatible with both the tantalum of the batten strip 40 and the weld pad 68. This produces a short connecting bead 70 which merges at each of its ends with interrupted bead 60 along the flange 46 of the batten strip. The connecting bead 70, like the cross bead 56, is perhaps brittle, by reason of the fact that the tantalum along it is contaminated with other metals, but the connecting bead 70 and the end of the intersecting batten strips 40 along which it lies are all isolated from the interior of the vessel A by a cover plate 72 (FIGS. 6 & 8) which is contoured to conform to exposed surfaces of the two batten strips 40 which meet at the intersection, as well as to the adjoining corner regions of the cladding 22. The cover plate 72 completely encircles the short connecting bead 66 and is welded along its perimeter to the exposed surfaces of two batten strips 40 and to the cladding 22 as well as along a peripheral weld bead 74. Like the other weld beads 60 and 66, the bead 74 does not fully penetrate the tantalum of the two batten strips 40 nor the tantalum of the cladding 22.

Figure 9:
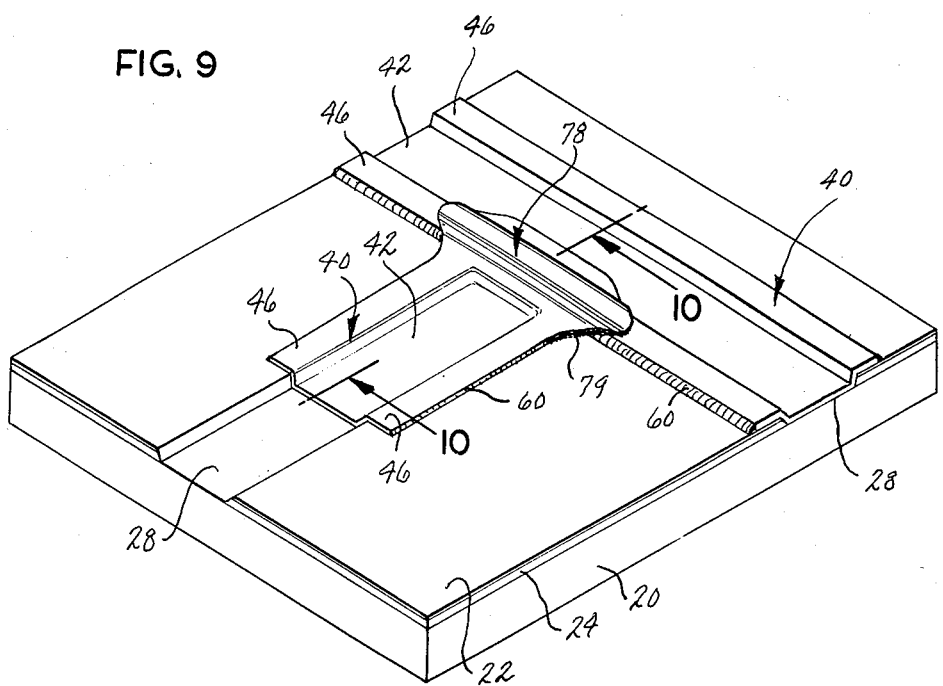
FIG. 9 is a perspective view in section showing a cover plate attached to the end of batten strip and overlapping a T-shaped intersection between batten strips.
Figure 10:
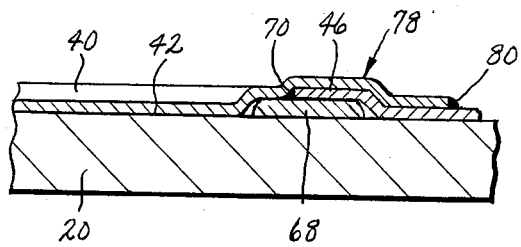
FIG. 10 is a sectional view taken along line 10—10 of FIG. 9.

In lieu of the cover plate 72 which extends over both of the batten strips 40, a modified cover plate 78 (FIGS. 9 & 10) is welded to the end of the batten strip 40 which fits into the groove 28 that terminates at the circumferential groove 28, so that the modified cover plate 78 constitutes an extension of the batten strip 40. Indeed, the plate 78 extends over the connecting bead 70 and the flange 46 along which that bead is located, as well as over the adjacent portions of the cladding 22, and is welded to the exposed face of the circumferential batten strip 40 and the nearby cladding 22 as well as along a weld bead 79 that is actually a continuation of the bead 60 along the flanges of the batten strip 40.

The cladding 22 together with the batten strip 40 and the cover plates 64 and 72 totally isolate the steel backing 20 from the interior of the vessel A, so that highly reactive chemicals do not come into contact with steel backing 20. The cladding 22, on the other hand, is for all intents and purposes inert to the chemicals and therefore does not experience any corrosion. Yet the steel backing 20, being relatively thick and tough, is capable of resisting high internal pressures that exist within the vessel A.

Some refractory metals such as titanium and zirconium and their alloys melt at temperatures more closely approaching the melting temperature of steel and further may have better heat absorbing characteristics. Thus, when welded, the steel backing behind such claddings will not melt. In that case the copper intermediate layer may be eliminated, but the batten strips 40 are the same and are applied in the same manner.

In a somewhat simpler arrangement (FIG. 11) that end of the batten strip 40 at which the inert gas is introduced for protecting the flange welds 60 as they are formed, is left undistorted, and is at its end edge joined to the backing 20 and cladding 22 along an end weld 80. To isolate the portion of the backing 20 between the adjacent ends of the strip 40, a cover plate 82 spans the short space between those ends and laps over the strip 40 slightly beyond its ends as well as over the adjacent region of the cladding 20. The cover plate 82 is attached to the joined together segments 16 and 18 and to the batten strip 40 along a weld 84 that extends the full perimeter of the cover plate 82. The plate 82 is, of course, formed from the same corrosion resistant material as the cladding 22 and the batten strip 40, and inasmuch as the batten strip 40 lacks a raised cross portion, the cover plate 82 does not have the compound curvatures of the cover plate 64. Indeed, the cover plate 82 possesses a simple undulated configuration.

The joint formed at the cover plate 82 is particularly suited for use where the cladding 22 is bonded directly to the backing 20, such as where a zirconium or titanium cladding 22 is over a steel backing 20.

Figure 11:
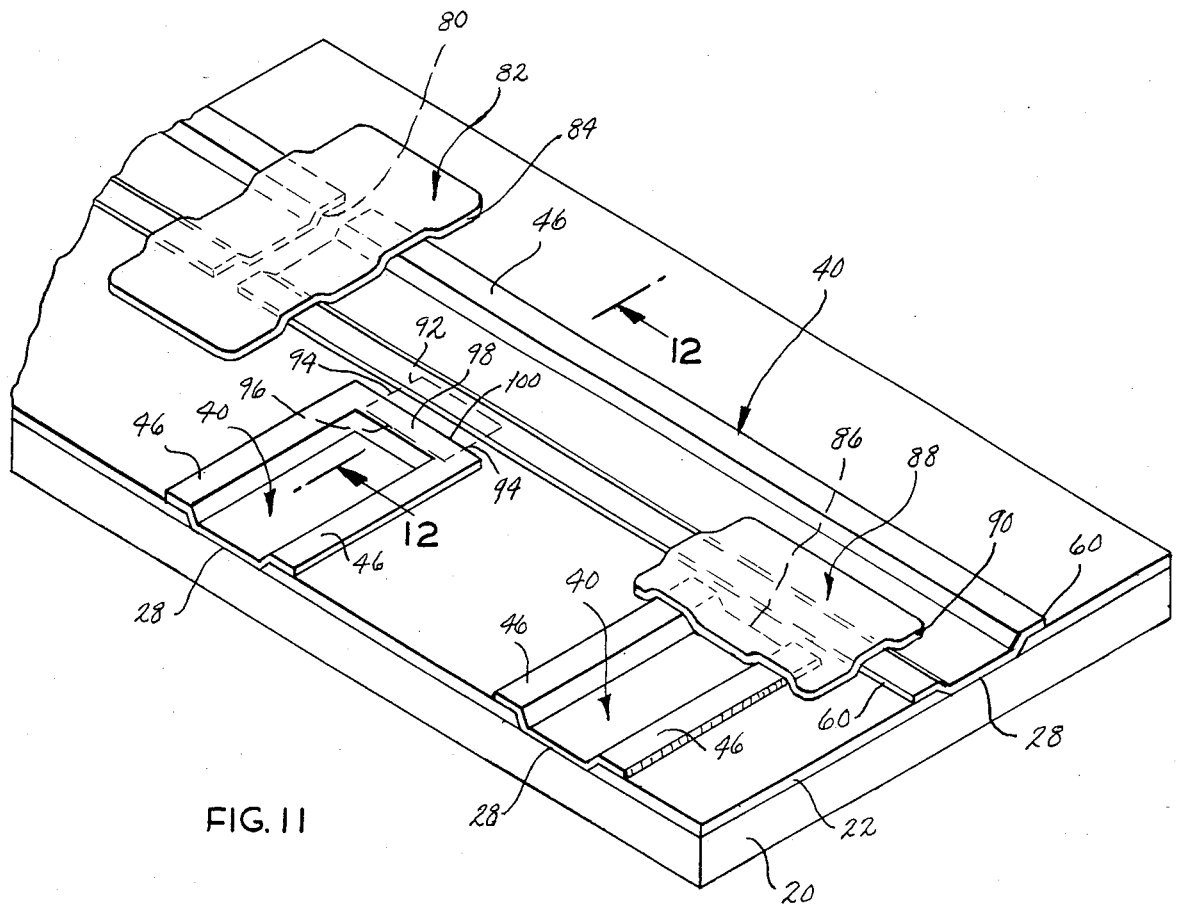
FIG. 11 is a perspective view in section showing several modified joints between longitudinal or arcuate seams and circumferential seams.
Figure 12:
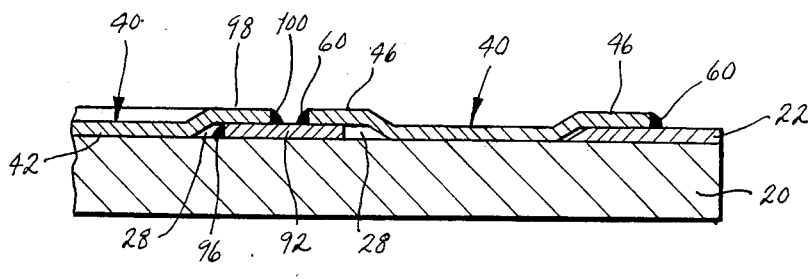
FIG. 12 is a sectional view taken along line 12—12 of FIG. 11.

In a similar vein the filler piece 68 may be eliminated at the T-shaped intersection where an arcuate or longitudinal seam 10 or 12 meets a circumferential seam 6 (FIG. 11). In that case, the batten strip 40 for the arcuate or longitudinal seam 10 or 12 is brought up close to the flange 48 of the batten strip 40 that is over the groove 28 for the circumferential seam 6, and here an end weld 86 extends along the end of that batten strip 40, attaching that end to the backing 20 at the base of the groove 28. The adjacent flange 46 for the batten strip 40 of the circumferential seam 6 is of course welded to the cladding 22 along the weld bead 60, but this weld beam may be interrupted at the groove 28 for the arcuate or longitudinal seam 10 or 12. The intersection so formed is isolated by a cover plate 88 which is contoured to fit over the end of the strip 40 for the arcuate or longitudinal seam 10 or 12 and the adjacent portion of the strip 40 for the circumferential seam 6 and also over the adjacent regions of the cladding 22. The cover plate 88 is attached to the two batten strips 40 and to the cladding 20 at a weld bead 90 which extends along the full perimeter of cover plate 88.

Where an arcuate or longitudinal seam 10 or 12 joins a circumferential seam 6, the joint so formed may be completed without a cover plate (FIGS. 11 & 12). To this end, the groove 28 for the arcuate or longitudinal seam 10 or 12 is, where it opens into the groove 28 of the circumferential seam 6, fitted with a filler piece 92 which is as thick as the grooves 28 are deep. Thus, the filler piece 92 lies flush with the exposed surface of the cladding 22. Moreover, the filler piece 92 is welded to the cladding along the edges of the groove 28 in which it lies, that is the groove 28 of the arcuate or longitudinal seam 10 or 12, at weld 94 and may also be attached to the backing 20 at a cross weld 96 which extends across the groove 28. The filler piece 92 is formed from the same corrosion resistant metal as the cladding 20, and the same holds true for the side welds 94. Moreover, the welds 94 are ground flush with the exposed surfaces of the cladding 22 and filler piece 92, so that the cladding 22, the filler piece 92 and the welds 94 appear as a continuous surface at the end of the groove 28 for the arcuate or longitudinal seams 10 or 12. One flange 46 of the batten strip 40 for the circumferential seam 6 extends over the filler piece 92 and the weld bead 60 along its edge penetrates the filler piece 92 as well as the welds 94 along the sides of the piece 92. The other batten strip 40, that is the one in the intersecting groove 28 of the arcuate or longitudinal seam 10 or 12, is at its end raised to provide a raised cross portion 98 which lies in the same plane as the flanges 48 for that strip 40. The cross portion 98 also lies over the cross piece 92 and along its end edge a weld bead 100 extends, that bead likewise penetrating the filler piece 92 as well as the welds 94 and cladding 22 on each side of the piece 92. The end bead 100 merges into the beads 60 along the flanges 46 of its batten strip 40 and is spaced slightly from the weld bead 60 along the flange 46 of the strip 40 for the circumferential seam 6.

This invntion is intended to cover all changes and modifications of the example of the invention herein chosen for purposes of the disclosure which do not constitute departures from the spirit and scope of the invention.

What is claimed is:

1. A process for joining components each having a backing of one metal and a cladding of another metal, with the cladding being bonded securely in place over the backing, said process comprising: removing the cladding from the backing adjacent to an edge of each of the components to expose the backing; with the cladding of the two components facing generally in the same direction, placing the components together edge-to-edge along their edges at which the cladding has been removed, whereby a groove exists where the cladding has been removed; thereafter welding the components together at their backings; placing a batten strip having detached ends along the groove with the batten strip having a depressed portion that fits into the groove, the batten strip also having flanges along the sides of the depressed portion such that the flanges overlie the cladding; welding the batten strip to the cladding along the side edges of the flanges; at each end of the batten strip installing a closure that blocks the end of the strip; and welding the closure to the batten strip and to the cladding to totally isolate the groove and the portion of the backing exposed in it from the region to which the cladding is exposed.

2. The process according to claim 1 wherein the batten strip is made from the same metal as the cladding.

3. The process according to claim 2 and further comprising passing an inert gas through the groove as the batten strip is welded to the cladding.

4. The process according to claim 1 wherein a protective layer is interposed between and bonded to the cladding and to the backing and is also removed from along the edge of each component.

5. The process according to claim 4 wherein the backing is steel, the cladding is tantalum, and the protective layer is primarily copper.

6. The process according to claim 3 and further comprising placing a barrier across one end of the batten strip, and introducing the inert gas into the groove ahead of the barrier.

7. The process according to claim 6 wherein the batten strip at said one end is provided with a raised portion which merges into the depressed portion; and further comprising placing a filler metal in the groove behind the raised portion of the strip to form the barrier.

8. The process according to claim 1 wherein the step of installing a closure includes placing a cover plate over the end of the strip so as to completely cover the end edge of the strip, and the step of welding the closure includes welding the cover plate along its periphery to the cladding, the cover plate being formed from the same metal as the cladding.

9. The process according to claim 1 wherein more than two components are joined together along at least two grooves which intersect at a T-shaped intersection, there being a batten strip along each groove, and further comprising placing a filler metal in the groove which terminates at the intersection such that it is beneath one of the flanges for that batten strip that continues through the intersection, welding that flange to the filler piece along a connecting weld, and wherein the step of installing a closure includes placing a cover plate over the connecting weld.

10. The process according to claim 9 wherein the cover plate is also placed over the batten strip that terminates at the intersection and is welded to the two batten strips and the cladding at the exposed surfaces thereon.

11. The process according to claim 9 wherein the cover plate is welded to the end edge of the batten strip that terminates at the intersection.

12. The process according to claim 1 wherein the batten strip initially has along the edges of its flanges lips which project away from the cladding over which the flanges lie, and wherein the step of welding the batten strip includes utilizing the lips as a source of weld metal to produce a fillet weld of convex cross-sectional configuration.

13. The process according to claim 1 and further comprising temporarily sealing the flanges of the batten strip to the cladding and introducing an inert gas into the groove prior to welding the batten strip to the cladding.

14. The process according to claim 13 wherein the flanges are temporarily sealed to the cladding with adhesive-backed tapes which adhere to the flanges and cladding.

15. A pressure vessel comprising: first and second components which are joined together along a first seam to form part of the wall of the pressure vessel, each component having a steel backing and a cladding located over the backing and being bonded securely to the backing so as to be presented inwardly toward the interior of the vessel, the backings on the two components being welded together at the seam, the claddings at the seam being removed to provide a groove; a first batten strip located along the first groove and having ends, the batten strip having a depressed portion which fits into the groove and flanges projecting away from the depressed portion along its sides, the flanges overlying the cladding and being welded to the cladding along their edges, a closure at each end of the batten strip, the closure being welded to the batten strip and to the cladding to totally isolate the groove and the portion of the backing exposed in it from the interior of the pressure vessel.

16. A pressure vessel according to claim 15 and further comprising a protective layer interposed between the cladding and the backing.

17. A pressure vessel according to claim 15 wherein the pressure vessel further comprises a third component, also having a backing and a cladding and being joined to the first component along the first seam and to the second component along a second seam which intersects the first seam at a T-shaped intersection; wherein a second groove extends along the second seam and at its end opens into a side of the first groove; wherein a second batten strip having a depressed portion and flanges is fitted into the second groove and is welded to the cladding along its flanges, wherein a filler piece is fitted into the end of the second groove where it opens into the first groove all such that the filler piece is beneath one of the flanges on the first strip; and wherein said one flange of the first strip is welded to the filler strip along a short connecting weld, and wherein one of the closures is a cover plate extended over and completely covering the connecting flange, the plate along its periphery being welded to the first and second batten strips and to the cladding.

18. A pressure vessel according to claim 15 wherein the batten strip at one of its ends has a raised portion which merges into the depressed portion but is spaced from the base of the groove, a filler piece in the groove behind the raised portion of the batten strip so that the filler piece forms a blockage at the end of the batten strip.

19. A pressure vessel according to claim 18 wherein the batten strip along its raised portion is welded to the filler piece at a fillet weld.

* * * * *